United States Patent Office 2,768,183
Patented Oct. 23, 1956

2,768,183

ANTHRAQUINONE DYESTUFFS

Milton L. Hoefle, Roseville, Mich., assignor to General Aniline & Film Corporation, New York, N. Y., a corporation of Delaware No Drawing. Application August 4, 1954,
Serial No. 447,886

5 Claims. (Cl. 260—377)

This invention relates to the production of a new series of anthraquinone dyestuffs and to mixtures of such dyestuffs with other anthraquinone dyestuffs.

The problem of providing acid gas resistant dyestuffs in the blue range for cellulose acetate rayon fibers and other fibrous material having a basis of polymeric material has long been recognized. Dyestuffs of the amino anthraquinone series have up to the present time found widespread acceptance for such use, but in almost all instances, the blue colorations heretofore obtained do not have perfect resistance to acid gas fumes, the action of which in general produces reddening and dulling of the shade to an undesirable extent. While reddish-blue shades may per se be acceptable and even desirable in some instances, such shades are in general associated in the consumer's mind with undesirable fading.

It is an object of this invention to provide a dyestuff composition capable of dyeing acetate rayon and other film and fibrous materials in blue shades having substantially no tendency to fade to reddish tinges upon exposure to acid gas fumes and other deleterious influences. Another object of this invention is to provide a new series of anthraquinone dyestuffs which may be employed for producing such dyestuff mixtures. Other objects and advantages of this invention will appear from the following description.

The attainment of the above objects is made possible by the present invention which broadly comprises the provision of a composition comprising a blue anthraquinone dyestuff subject to changing to reddish hues upon exposure to acid gas fumes and a blue anthraquinone dyestuff subject to changing to greenish hues upon exposure to acid gas fumes. In this manner, the reddish hues are counterbalanced by the greenish hues acquired by the components of the composition upon exposure to acid gas fumes, whereby the original blue shade of the dyeings, remains unaltered, though a dulling may in some instances be discernible.

As a further feature of this invention, a new series of amino anthraquinone dyestuffs have been found which possess the desirable property of producing blue shades in dyeings, which shades acquire greenish hues upon exposure to acid gas fumes. This new series of dyestuffs comprise compounds having the following formula:

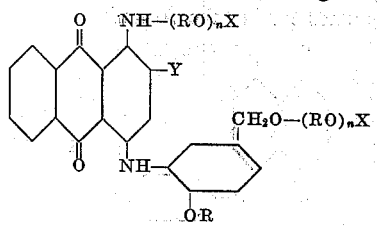

wherein Y is selected from the group consisting of —CN and —CONH—(RO)$_n$X, R is lower alkyl, X is selected from the group consisting of H and lower alkyl, and $n$ has a value of zero to 3. In this formula, the term "lower alkyl" includes such radicals as methyl, ethyl, propyl, isopropyl, and the like. It will be understood that in any particular compound included within the scope of the above depicted formula, the defined substituents in the 1, 2 and 4-positions may have the same or different values within the ranges stated.

The compounds of the above formula may be made by several different methods. In the following description of such methods, Y, R, X and $n$ have the values given above.

I. An aminoanthraquinone having a formula as illustrated above except for a halide or sulfonic acid group in the 2-position is reacted with respectively CuCN or a water-soluble salt of hydrocyanic acid such as sodium cyanide, potassium cyanide, ammonium cyanide, etc., to replace the halide or sulfonic acid radical with a nitrile radical. Depending upon the starting components and the operating conditions, the resulting products may include compounds containing a nitrile group in the 3-position also.

II. An aminoanthraquinone having a formula as illustrated above except for a reactive radical such as halide (Cl or Br), NO$_2$, alkoxy or aryloxy in the 4-position is reacted with an arylamine of the formula:

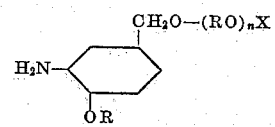

This condensation may be carried out if desired in the presence of catalysts such as copper, cuprous or cupric salts, and/or acid binding agents such as sodium carbonate, bicarbonate or acetate and/or in an inert inorganic or organic solvent or diluent.

III. An aminoanthraquinone having a formula as illustrated above except for a reactive radical such as halide (Cl or Br), NO$_2$, alkoxy or aryloxy in the 1-position is reacted with an amine of the formula H$_2$N—(RO)$_n$X.

IV. An aminoanthraquinone having a formula as illustrated above except for a carboxylic acid halide or ester group in the 2-position is reacted with an amine of the formula H$_2$N—(RO)$_n$X to produce the corresponding carboxamide.

V. An aminoanthraquinone having a formula as illustrated above except for a nitro group in the 1-position is subjected to reduction, followed if desired by reaction with a compound containing the group —(RO)$_n$X joined to a reactive radical.

VI. An aminoanthraquinone having a formula as illustrated above containing a nitrile group in 2-position is subjected to controlled hydrolysis (in view of the secondary amino groups present in 1 and 4-position) to produce the corresponding carboxamide, followed if desired by reaction with a compound having the group —(RO)$_n$X joined to a reactive radical.

Other methods of producing the compounds of this invention will become apparent to the person skilled in the art. Similarly, it will be obvious that in certain instances sensitive radicals or groups already present in the intermediates from which the compounds of this invention are produced must be blocked or protected during the reaction.

Besides the property of acquiring a greenish hue upon exposure to acid gas fumes, the above described compounds of this invention have good light- and washfastness properties and good substantivity for the material to be colored. In addition to cellulose acetate, the dyestuffs of this invention may be employed for coloring other natural or synthetic polymeric material in bulk, film or fiber form, including polyamides, polyesters, and polyacrylonitriles and the like, such as nylon, Orlon, Dacron, Acrilan, Dynel, and the like.

The aforementioned compounds may be mixed in any required proportions with known blue anthraquinone dyestuffs subject to changing to reddish hues upon exposure to acid gas fumes. The proportions of the compounds of this invention to be employed in such mixtures will of course be dependent upon the quantum of reddish hues to be neutralized or compensated for, which in turn is dependent upon the number, types and amounts of anthraquinone dyestuffs in the mixtures producing such reddish hues, the material being dyed and the like. In general, blue anthraquinone dyestuff mixtures containing proportions of about 25 to 75 parts by weight of the compounds of this invention and about 75 to 25 parts by weight of at least one other anthraquinone dyestuff subject to changing to reddish hues upon exposure to acid gas fumes will produce satisfactory blue shades which are substantially unaffected by exposure to acid gas fumes.

The following examples in which parts are by weight unless otherwise indicated, will serve to illustrate the invention, but they are not intended to limit it thereto.

*Example 1*

Into a stirred autoclave were placed 20.0 parts 1-amino-4-(α-hydroxy-6-methoxy-m-toluidino)-2-anthraquinonesulfonic acid, prepared by the condensation of bromamine acid and 5-amino-4-methoxybenzyl alcohol [the latter compound may be produced by the process described in Ber. 34, 2459 (1901)], 11.0 parts potassium cyanide and 500 parts water. The contents of the autoclave were then heated at 140° C. for eight hours. The reaction mixture was then filtered, thoroughly washed with hot water until the filtrate was colorless, and dried. The final weight of the dried blue powder obtained was 12.3 parts. It dyed rayon acetate in bright blue shades which became green when exposed to the action of gas combustion fumes. The structure is shown below.

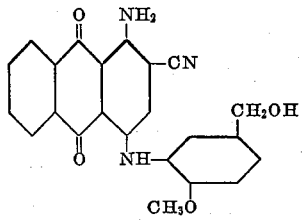

*Example 2*

The same procedure as outlined in Example 1 was used except that the 20.0 parts of 1-amino-4-(α-hydroxy-6-methoxy-m-toluidino)-2-anthraquinonesulfonic acid were replaced by 20.0 parts of 1-amino-4-[α-(2-hydroxyethyl)-6-methoxy-m-toluidino]-2-anthraquinone sulfonic acid. The product possessed properties similar to those indicated in Example 1. The structure is shown below.

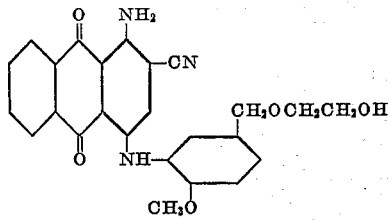

*Example 3*

Into a reaction vessel equipped with a stirrer, thermometer and reflux condenser were charged 10.0 parts N'-(2-hydroxyethyl)-1-(2-hydroxyethylamino)-4-bromo-2-anthraquinonecarboxamide, 7.5 parts 5-amino-4-methoxybenzyl alcohol, 5.0 parts sodium carbonate, 5.0 parts sodium bicarbonate, 0.5 part cuprous chloride, 150 parts water and 25 parts ethanol. The resulting mixture was heated at reflux for eight hours. It was then cooled, filtered, and washed with 200 parts hot water (65° C.). Upon drying, 7.4 parts of product were obtained which dyed cellulose acetate a bright blue-green shade, which when exposed to the action of combustion gas fumes became bright green. The structure is shown below:

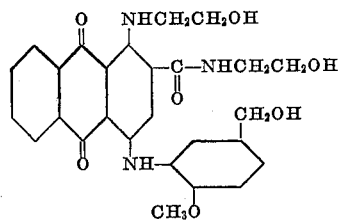

*Example 4*

The same procedure as outlined in Example 3 was used except that 8 parts of 5-amino-4-methoxybenzyl-(2-hydroxy)ethyl ether were used in place of the 7.5 parts 5-amino-4-methoxybenzyl alcohol. The product possessed very similar properties to those indicated in Example 3. The structure is indicated below.

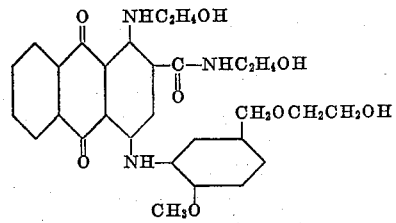

*Example 5*

Equal amounts of the product from Example 1 and 1-amino-4-cyclohexylamino-2-anthraquinonecarboxamide were intimately mixed and the resulting mixture was dispersed in the usual manner. The resulting dyestuff mixture dyed cellulose acetate in blue shades which upon exposure to the action of combustion gas fumes dulled slightly but remained practically the same shade.

*Example 6*

In Example 5 above the 1-amino-4-cyclohexylamino-2-anthraquinonecarboxamide was replaced by an equal weight of 4,8-dimethylaminoanthrarufin. In this case also, the gas fastness of the resulting mixture was much improved over the gas fastness of the two components when they were dyed separately.

*Example 7*

In Example 5 above, the 1-amino-4-cyclohexylamino-2-anthraquinonecarboxamide was replaced by an equal weight of 1-amino-2-cyano-4-(p-methylaminoanilino) anthraquinone. The gas fastness of the resulting mixture is improved in similar manner.

This invention has been described with respect to several preferred embodiments thereof and various modifications and variations thereof will become obvious to the person skilled in the art. It is to be understood that such modifications and variations are included within the spirit and purview of this application and the scope of the appended claims.

I claim:
1. Compounds having the formula

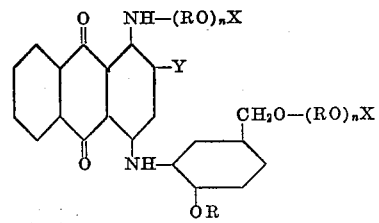

wherein Y is selected from the group consisting of —CN and —CONH—(RO)$_n$X, R is lower alkyl, X is selected from the group consisting of H and lower alkyl, and $n$ has a value of zero to 3.
2. A compound having the formula
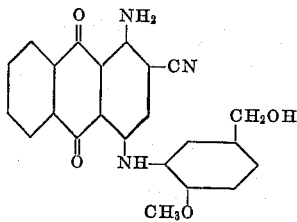
3. A compound having the formula
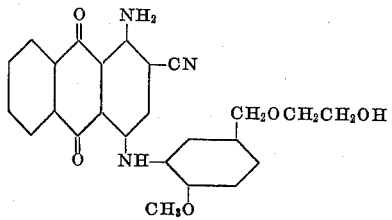
4. A compound having the formula
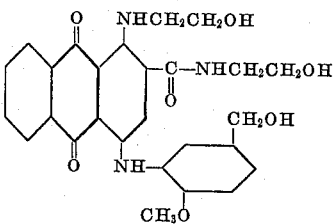
5. A compound having the formula
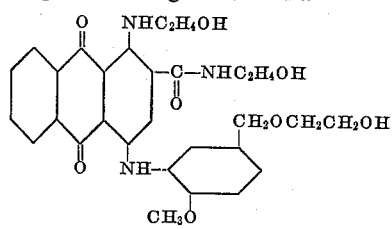
References Cited in the file of this patent
UNITED STATES PATENTS
| | | |
|---|---|---|
| 2,060,186 | Felix | Nov. 10, 1936 |
| 2,426,577 | Scalera | Aug. 26, 1947 |
| 2,506,020 | Grossmann | May 2, 1950 |
| 2,510,088 | Dickey et al. | June 6, 1950 |
| 2,587,002 | Seymour | Feb. 26, 1952 |